Feb. 3, 1948.  E. FREYSSINET  2,435,345
PILES AND METHOD OF MAKING THE SAME
Filed June 8, 1945  6 Sheets-Sheet 1
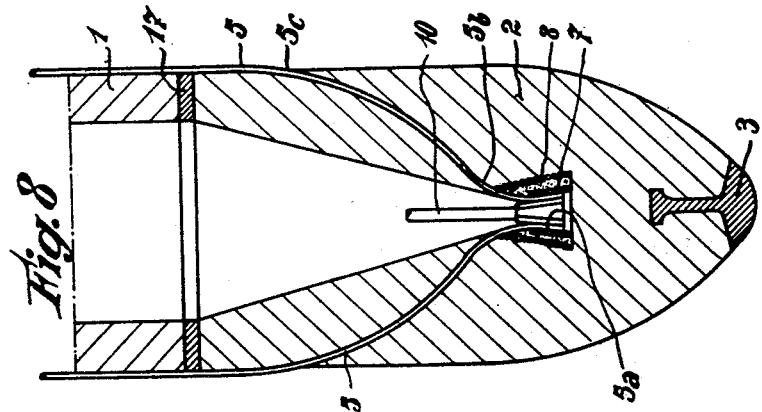
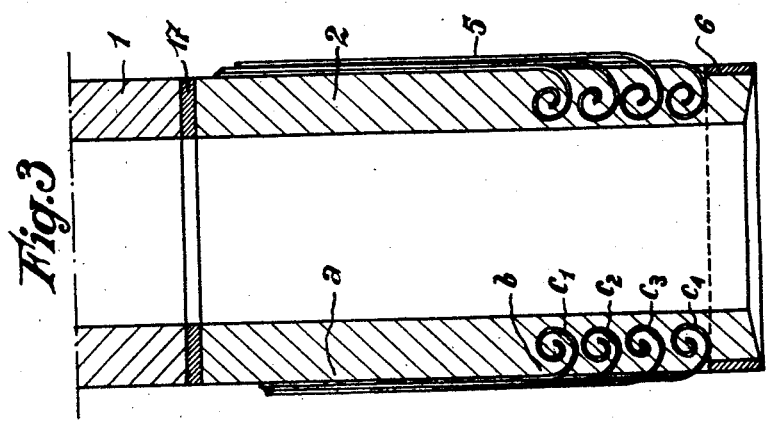
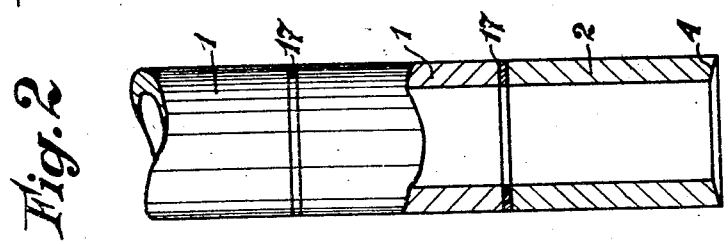
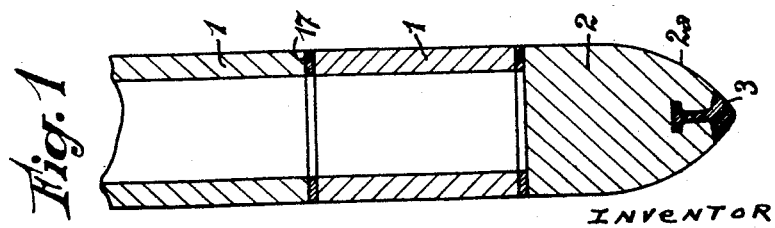
INVENTOR
Eugène Freyssinet
By Watson, Cole, Grindle &
Watson Feb. 3, 1948. E. FREYSSINET 2,435,345
PILES AND METHOD OF MAKING THE SAME
Filed June 8, 1945 6 Sheets-Sheet 2
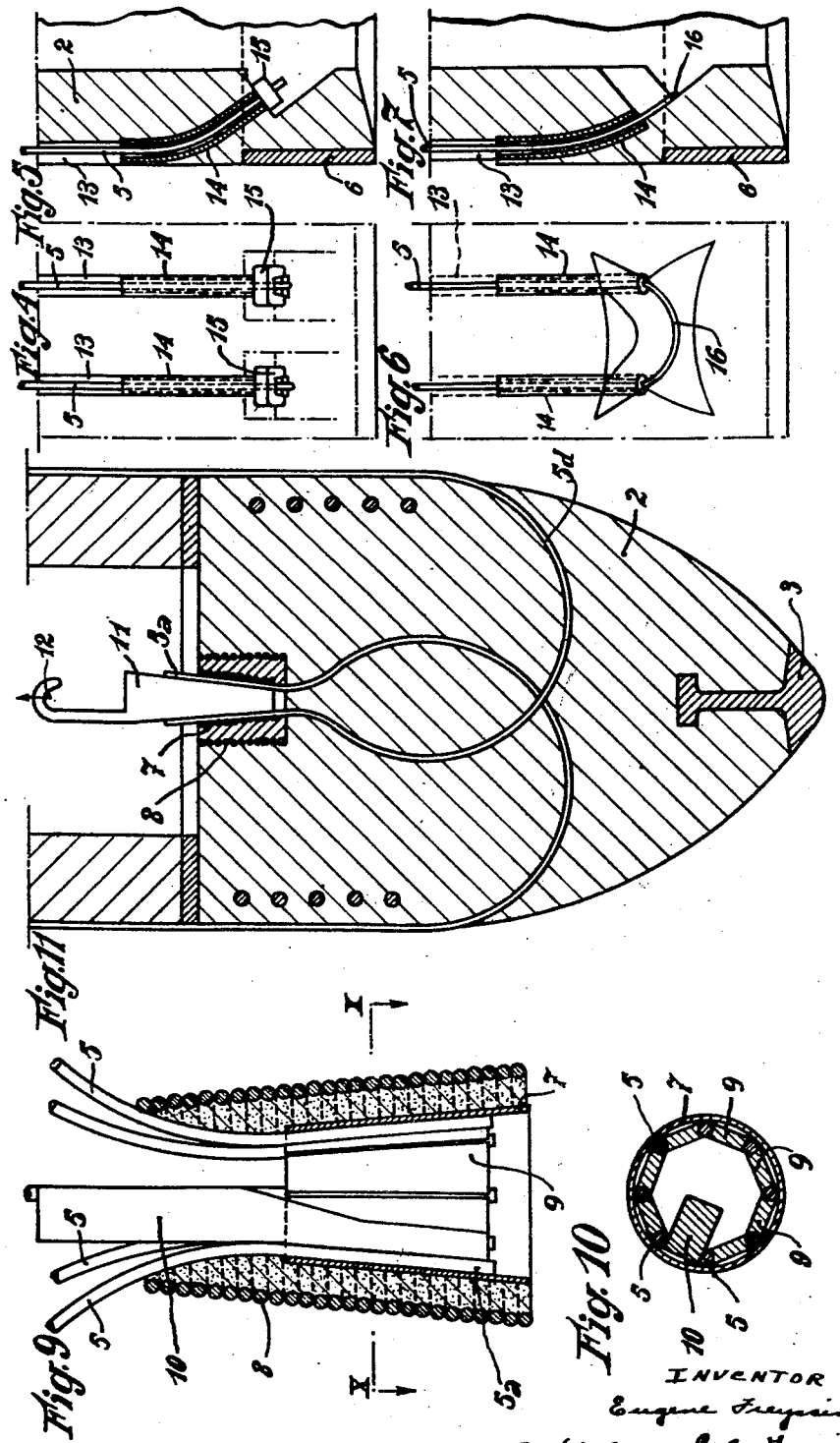

Feb. 3, 1948. E. FREYSSINET 2,435,345
PILES AND METHOD OF MAKING THE SAME
Filed June 8, 1945 6 Sheets-Sheet 3
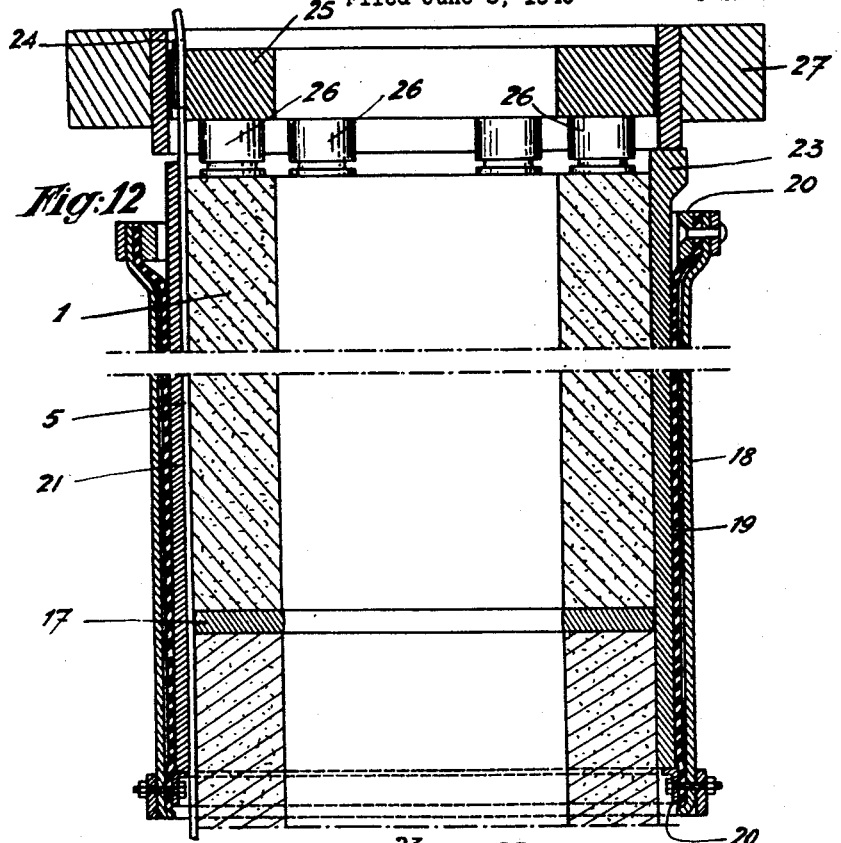
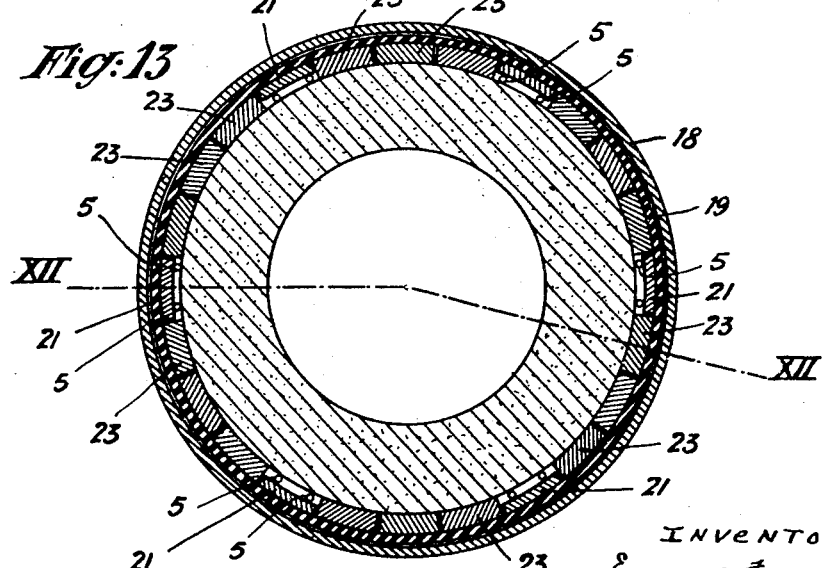
INVENTOR
Eugene Freyssinet
By Watson, Cole, Grindle &
Watson Feb. 3, 1948. E. FREYSSINET 2,435,345
PILES AND METHOD OF MAKING THE SAME
Filed June 8, 1945 6 Sheets-Sheet 4
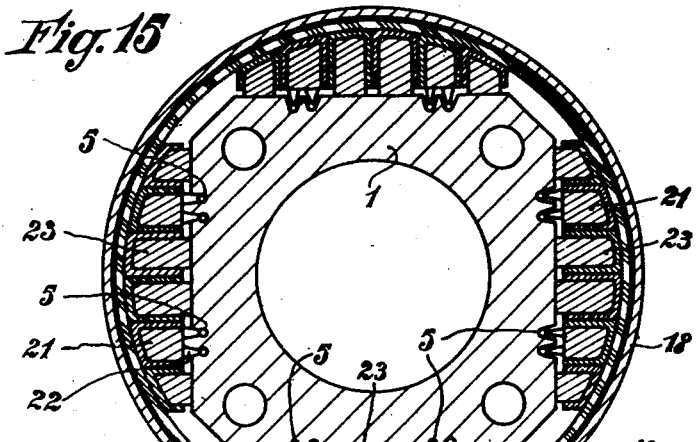
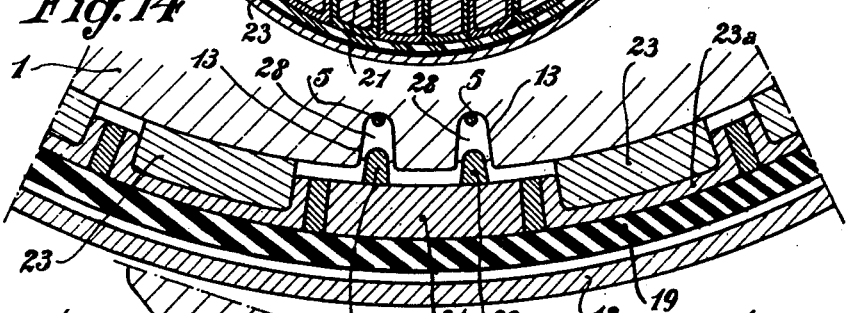
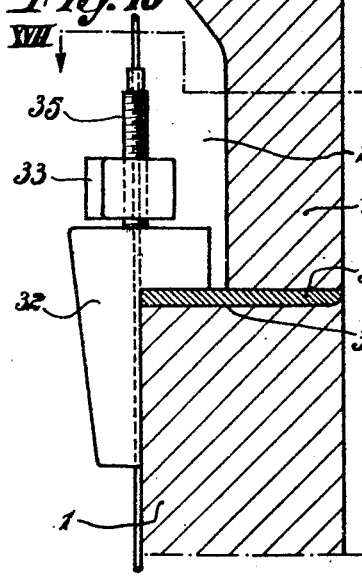
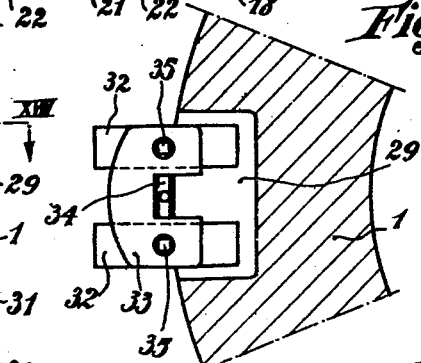
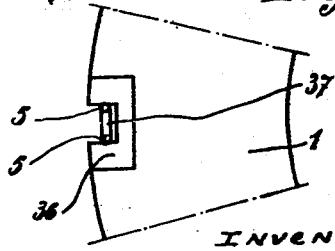
INVENTOR
Eugene Freyssinet
By Watson, Cole, Grindle + Watson Feb. 3, 1948.  E. FREYSSINET  2,435,345
PILES AND METHOD OF MAKING THE SAME
Filed June 8, 1945   6 Sheets-Sheet 5
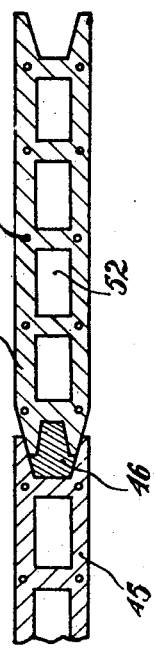
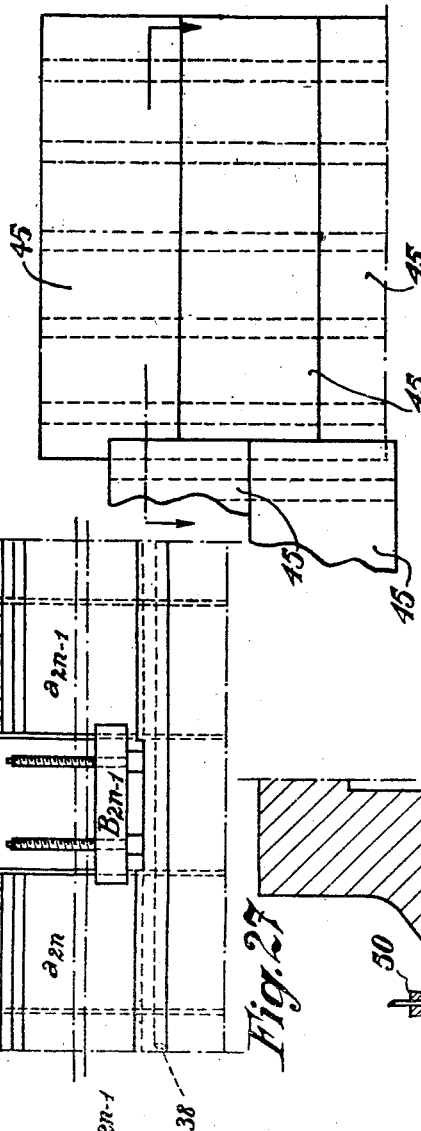
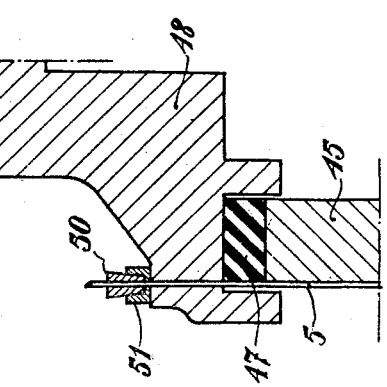
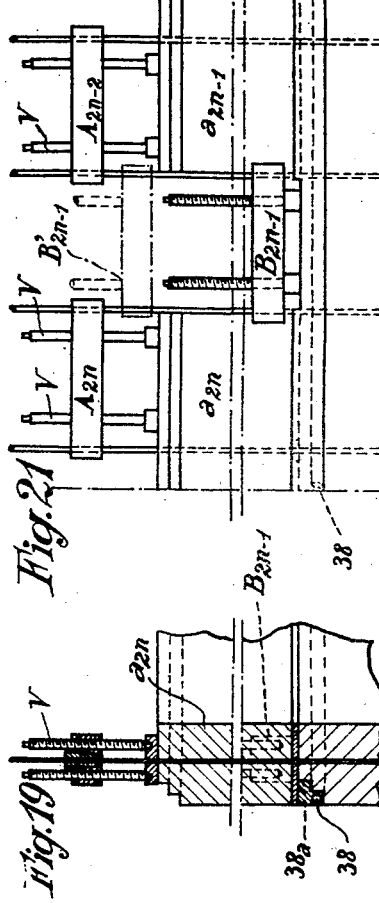
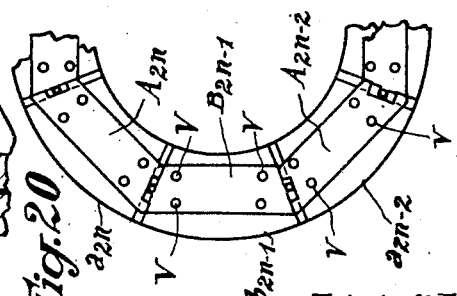
INVENTOR
Eugene Freyssinet
By Watson, Cole, Grindle
& Watson Feb. 3, 1948. E. FREYSSINET 2,435,345
PILES AND METHOD OF MAKING THE SAME
Filed June 8, 1945 6 Sheets-Sheet 6
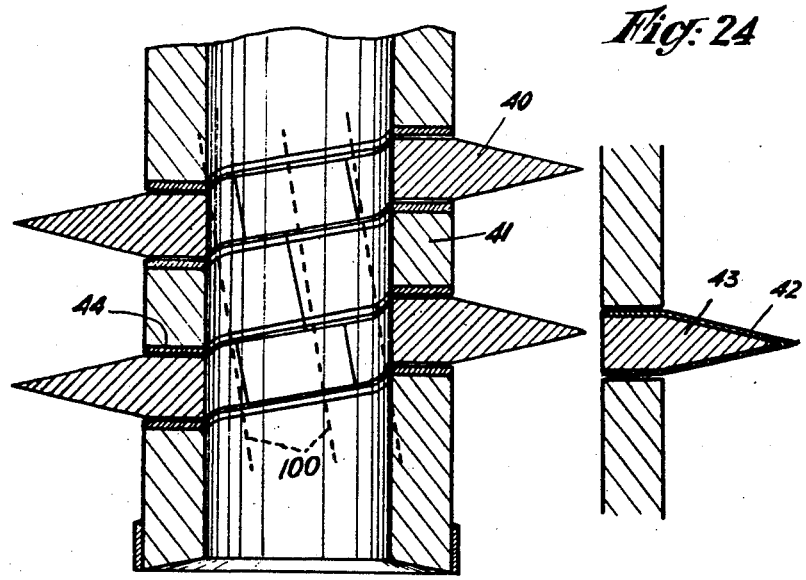
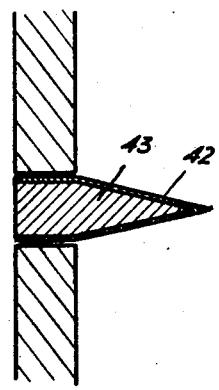
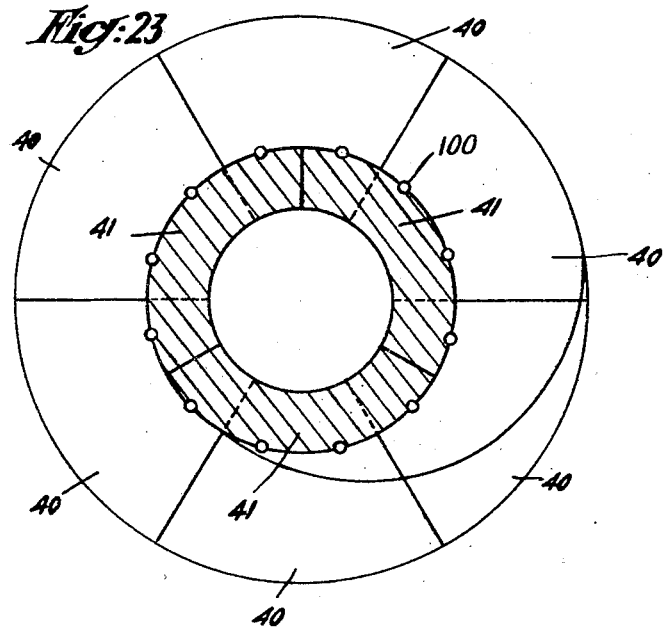
INVENTOR
Eugene Freyssinet
By Watson, Cole, Grindle & Watson Patented Feb. 3, 1948

2,435,345

UNITED STATES PATENT OFFICE 2,435,345

PILES AND METHOD OF MAKING THE SAME

Eugène Freyssinet, Neuilly-sur-Seine, France

Application June 8, 1945, Serial No. 598,314
In France July 19, 1944

12 Claims. (Cl. 61—56)

1

In prior patents, applications for patents and publications, I have shown that either from isotropic, homogeneous materials in one piece or from separate parts juxtaposed with or without intervening joints, it is possible to produce construction or structural elements, provided the whole is subjected to permanent compression to such an extent as to develop at any point therein local stresses larger than those traction stresses which the element under consideration is likely to be subjected to; from separate parts, it is then possible to build structural elements showing the same qualities as integral structures.

It is an object of this invention to provide a process for building up cylindrical or prismatic structures from separately manufactured units or sections which are assembled together in situ, wherein a compression stress is extended to each newly added unit or section without releasing compression imposed on the already assembled unit.

A more particular object is to sink a sectional pile according to the aforesaid process.

Another object is to provide means whereby in building a sectional structure compression can be extended without any release from the last assembled section to a newly added section.

Still further objects will become apparent as the specification proceeds.

With a view better to showing the features and objects of my invention, I shall proceed with the description of its simplest application which in practice is one of the most important, to wit the manufacture of piles or foundation columns, and by way of simplification, I shall firstly refer only to circular sections.

The following description will be made with reference to the accompanying drawings given solely by way of examples and wherein:

Figs. 1 and 2 diagrammatically show two examples of piles in accordance with this invention.

Figs. 3 to 7 illustrate the manner of anchoring reinforcements in a pile as shown on Fig. 1.

Figs. 8 to 11 show reinforcement anchorages for a pile as shown on Fig. 1, Fig. 10 being a section taken along line X—X on Fig. 9.

Figs. 12 and 13 illustrate an example of a reinforcement squeezing collar, Fig. 12 being a section taken along line XII—XII on Fig. 13.

Fig. 14 shows on a larger scale a portion of the squeezing collar in the case of permanent reinforcements.

Fig. 15 shows an instance of a square section pile.

Figs. 16 and 17 relate to a modification of means

2 for provisionally securing tensioned reinforcements along any sleeve other than the first or end sleeve, Fig. 17 being a section taken along line XVII—XVII on Fig. 16.

Fig. 18 shows a device for holding a reinforcement after tensioning.

Figs. 19, 20 and 21 are a vertical section, a plan view and a side development of a pile, each sleeve of which is made of several juxtaposed parts.

Figs. 22 to 24 are examples of screw piles.

Figs. 25 and 26 illustrate an example of pileplanks.

Fig. 27 shows a ramming cap for elements constructed in accordance with this invention.

The piles shown on Figs. 1 and 2 are constituted by sleeves other than the first or end sleeves or sections 1 made of concrete which will not be reinforced in most cases but will be of the best grade and may be hooped, under tension if need be. The sleeves are limited by two cylinders, which are concentric in most cases, and more often than not cut across along planes at right angles to the generatrices; but it will be obvious that the surfaces of assembly may have different shapes. The radius of the central aperture may vary from zero to a considerable fraction of the outer radius. The first pile section 2 is often bigger, more bulky and stronger than sections intermediate between the first and end sections. According to instances and driving methods in use, it may be given, according to the character of ground, the shape of an ogive 2a having a non-reinforced tip, or reinforced by a cast-iron or steel point 3 (Fig. 1), or else the shape of a recessed ring 4 ending either in a perpendicular plane or in revolution surfaces of various shapes (Fig. 2). The latter arrangement enables inter alia of driving piles more easily by making use of the central hollow part, for instance by digging in the space within the tube or injecting water or compressed air.

In either case, reinforcements 5 made of wires or groups of wires which have a high tensile strength and may be twisted together or not, are anchored in the first section which will be the pile base. It may be useful to provide said base with hoops or other reinforcements so that it can withstand local stresses arising from tensioning of longitudinal pile reinforcements; the hoops may be adapted to play the part of cutters, thus making driving easier. As shown at 6 on Figs. 3, 5 and 7, the hoop may be made of one flat strip, or even altogether omitted where concrete of excellent grade is used.

Reinforcements 5 may be permanently or provisionally set. In the latter case, they may be either plain wires or standard twisted cables, preferably consisting only of metal parts.

The provisional reinforcements should be anchored in the pile base strongly enough to withstand efforts amounting to a considerable fraction P of their elastic limit, without any risk of failure for anchorage but said anchorage must also enable of recovering the reinforcement after completion of driving in, either by merely imposing on said reinforcement a stress considerably larger than P, or by releasing the reinforcement end.

An infinity of devices for securing the object aimed at, may be devised. A very simple one consists in providing as illustrated on Fig. 3, an anchorage having a limited known strength. Each wire is scrolled at its end into a spiral of precise shape, the ends of the component wires being untwisted and separated from one another where the reinforcement is a cable; the scrolled end and adjacent portion thereof are then embedded in concrete of highest possible grade, in the zone shown at $abc_n$.

By suitably selecting the length and the shape of the scrolled portion, the maximum stress which the cable can withstand before yielding of anchorage, may easily be adjusted to a predetermined value. Still more accuracy in determining the critical stress causing failure of anchorage may be obtained by subjecting the end portion of the wires (which are preferably drawn, cold rolled, hardened or otherwise treated) to a strong tempering with a view to lowering elastic limit or tensile strength. When the cable is strained, the end spirals subjected to stresses above their elastic limit thus lowered, are plastically drawn and slip with even, progressive unscrolling. In order to recover the cable, it is thus only necessary to increase tension thereon. Assuming for instance that the tension in operation amounts to 60 per cent of the elastic stress in untempered metal, the spiral shape may be so adjusted that the stress for pulling out the cable amounts e. g. to 80 per cent of said elastic stress.

In prior patents and applications for patents, I have described anchorage wherein friction of anchoring cones or wedges is used for immovably holding reinforcements. The patents and patent applications are: U. S. Patent No. 2,270,240; U. S. patent application Ser. No. 377,041, filed February 1, 1941; application for a French patent of addition Ser. No. 39,564, filed September 30, 1941; French patent application Ser. No. 490,497, filed April 28, 1944.

As shown on Figs. 8 to 11, the anchoring means described in said prior documents may be employed for attaching reinforcements in a pile constructed in accordance with this invention, a simple alteration being provided in order that the anchorage may be unlocked at will to release said reinforcements.

Fig. 8 shows an example, details of which are illustrated on Figs. 9 and 10.

A conical hoop 7 made of thin sheet metal reinforced on its external periphery by a helical hoop 8 provides a bearing surface for the ends 5a of reinforcements 5; driven between ends 5a are wedges 9 adapted to form, together with said ends, a conical surface which fits into female cone 7. Positioned between two adjacent reinforcements, is a special wedge 10 to which access may be had through the pile recess.

By driving wedge 10 which stands in projecting position, by means of a hammer operated from the top of the pile, this being easy after slackening tension, all reinforcements are loosened and then yield upon being relatively slightly pulled up. The wedges may then be recovered for instance with a magnet at the end of a rope. The combination of wedges 9 and 10 may also be replaced by one expanding cone adapted to be operated like wedge 10. In order much to facilitate pile construction, the concrete mass between hoops 7 and 8 may be molded beforehand. Reinforcement wires are then positioned, and concrete for the first pile section is poured so as to embed the wire ends from 5b to 5c.

The arrangement shown on Fig. 11 is similar to that illustrated by Fig. 8 but the wedges are in reverse direction, so that the stresses thereon are strongly lowered owing to the length of loops 5d imbedded in concrete. Instead of multiple wedges one central wedge 11 may be used and driven down by means of a hammer striking at 12, the hammer being for instance attached to a rope.

Other methods or devices for destroying the anchorage of reinforcement ends may be used, for instance electrically heating points thereof in the neighbourhood of their tips, melting members to break them and so on. There is an infinite number of possible modifications that fall within the scope of this invention, it being deemed unnecessary to overload the present specification with superfluous descriptions.

As illustrated by Figs. 4 and 5, the reinforcements may be placed only after moulding the first section. Grooves 13 are preserved in the peripheral wall of said section for accommodating reinforcements 5 which pass through the wall of section 2 within tubes 14. An anchorage is made at 15. Any anchorage as described in my aforesaid patents may be employed, for instance two wedges on either side of one wire, or one wedge jamming two or three wires in a common housing. Particularly, it is also possible, as illustrated by Figs. 6 and 7, to use one wire 14 looped to pass through two tubes 14, thereby providing a specially economic anchorage. As to loop 16, it may be embedded in concrete or pass through a further tube (not shown). By subjecting loop 16 to sufficient tempering, the reinforcements may be rendered suitable for recovery, but they could not be used again for the same purpose.

Where provisional reinforcements are used, they should be tangent to the pile base at the point of emergence therefrom, and they may be disposed in grooves such as 13 if protection is required. It may be remarked that such reinforcements, projecting on the outer surface of the pile, might move aside from the latter if the pile happened to bend while it is driven. A risk of buckling would arise by reason of reinforcement tension. This may be avoided by providing connections at intervals between the reinforcements and concrete, the connections being so made as to allow of slip if need be, when said reinforcements are removed; metal stirrups or the like set in a number of joints 17 (Figs. 1 and 2) may be used for this purpose.

The same result may be secured by arranging the reinforcements along helices having a very long pitch instead of along cylinder generatrices. The reinforcements will then impose on the pile a force which varies in accordance with the square of the angle between the helix and the cylinder generatrices. The reactions on the planes of assembly are inclined by the same angle as the helices. In actual practices this will entail no drawback as very small inclinations, e. g.

some hundredths, will be sufficient to obtain the result aimed at, to wit preventing the reinforcement from moving aside from the pile when the latter happens to bend.

The optimum pitch length thus amounts to that for which the pile might assume a curvature sagitta equal to a diameter thereof.

Identical provisions may be made with permanent reinforcement which differ from those above described only by their being more strongly anchored in order that the anchorage can withstand the tension at which reinforcements break. The anchorage may be of any known type.

Moreover it is necessary to protect reinforcements against oxidation. With reinforcements arranged on the outside of the pile, they will be accommodated in grooves in the periphery of pile sections, the grooves running along the direction of said reinforcements. The grooves will then be filled with mortar, preferably a cement mortar although other mortars such as bitumen mortar may also be used.

When the base section has been produced with all reinforcements anchored as above described, each reinforcement may be wound on a reel capable of holding a length thereof at least as long as required for the whole pile. Where permanent reinforcements are concerned, it may be advantageous to place on reels the wire bundles as supplied from drawing works, so as to avoid waste. It will be possible to avoid storage of pile bases provided with cumbersome reinforcements, by using arrangements as illustrated by Figs. 4 to 7.

After the first pile section has been provided with its reinforcements in any manner, it is positioned within the driving collar to be hereinafter described, and the reinforcement reels or reinforcements not wound on reels are distributed thereabout. The collar may be provided with guides adapted to centre each section with respect to the preceding one; inner centring rings may also be employed, such rings being useful in making joints as will be set forth below.

Where the joints are made with the help of mortar, a layer of binding mortar is spread on the upper part of the base thus obtained; the mortar is produced for instance from cement and fine sand and has preferably been subjected beforehand to a high frequency vibration in a suitable vessel; the joint shall have as regular a thickness as possible, adjusted for example by means of a rule guided by a pin which is fast therewith and caused to remain along the pile axis. Any other binding material may be used for said joint which may be exceedingly thin and restricted to a mere paint or varnish layer adapted to set, or even be omitted altogether, if the opposite surfaces are sufficiently fit for superimposition.

On said layer, the exposed surface of which is at right angles to the pile axis, the first current sleeve or section is laid. The reinforcements are then tensioned immediately. The upper part of Fig. 12 shows an example of a tensioning device.

The reinforcements are distributed in groups of two reinforcements and each group is squeezed by means of a trapezoidal key 24 jammed between the reinforcements in a notch provided in the rim of a steel member 25; member 25 is preferably annular, and fast with screw or hydraulic jacks 26, the latter preferably having a security screw. The jacks and screws rest on the top face of sleeve I intended to be connected by compression with the preceding pile components. The tensioning member is provided with as many notches as necessary for receiving two-wire groups. It may be divided into separate elements, each of which acts upon a wire group and is urged by two or three screws or jacks. It should be understood that only one of the numerous reinforcement tensioning means adapted to be used is herein described.

As soon as compression has taken place between the second sleeve and the first one, the third sleeve is to be placed but the first two sleeves must remain fast together, i. e. the reinforcement tension must be kept between the first and second sleeve. To this end it is necessary to make the reinforcements fast with the second sleeve by means of a device adapted to let altogether unobstructed the joint surface on which the third sleeve shall be laid, without releasing to any extent the reinforcement tension. This feature which is one of the essential features of my invention, may be obtained in numerous ways which ought to be considered as technically equivalent and hence are parts of my invention. As a first example, in the case of a round pile or more generally a pile capable of being girt with an externally circular collar, the reinforcements can be jammed on the pile with sufficient strength to provide for their fastening to concrete through friction. As the collar shall stand outside the reinforcements, it will preferably be positioned before the pile base as above explained. Pressure of reinforcements on the pile may be produced by numerous kinds of means, for instance a series of screws, wedges or hydraulic jacks backed by the collar; but the result aimed at will be more conveniently and rapidly secured by means of a hydraulic pressure. Figs. 12 and 13 exemplify a corresponding arrangement.

The collar is a sheet iron sleeve 18 within which is placed a resilient water-tight jacket 19, for instance made of rubber lined with fabric, which is nipped at its upper and lower ends, e. g. by means of members 20 bolted on the sleeve 18 to provide a water-tight joint. Any pressure developed between sleeve 18 and rubber jacket 19 will drive the latter towards staves 21 that will press reinforcements on to the pile outer surface and thus exert on concrete high local pressures making each reinforcement fast with concrete to such a degree as a welding would secure.

As a matter of fact, let us assume by way of example that a pressure of 50 kg. per sq. cm., i. e. a pressure easily attained, and staves 21 having a breadth of 4 cm. and a height of 1 m. for each reinforcement are used; the pressing force on each reinforcement will amount to 100.50.4=20,000 kg.; such a pressure is sufficient by reason of high friction of steel on concrete, to secure anchorage of a reinforcement tensioned to 6 or 7 tons without any risk of slippage. It will generally be of interest to arrange staves 21 so that each one presses two reinforcements.

Fig. 14 more particularly relates to permanent reinforcements accommodated in grooves 13 filled with mortar 28; pressure may be transferred from metal members 21 to mortar, e. g. through strips 22 that may be made of various substances. The strips may conveniently be loaded beforehand from cement mortar of a good quality. The pressure that will reach very high values (about hundreds of kilos per sq. cm.) will provide for sealing the concrete strips into the lining mortar 28 with instantaneous hardening of said mortar. Any and all provisional or permanent reinforcements being thus held, there is no objection to releasing tensioning members 25—26, then to removing them so as to set the joint surface free. The second sleeve will then be dealt with like the first one: Tensioning members 25, 26 are positioned again, reinforcements are fixed thereto and then stretched between the pressure collar and said members. It is advisable by way of security to tighten the security screws where hydraulic jacks are employed. The pressure from the collar on the reinforcements may then be released, and the collar is moved up, in helical fashion where helical reinforcements are used.

It is of interest widely to calculate the height of the squeezing collar, which may be larger than that of one sleeve, the sleeve height being determined by handling conditions; hence it may happen that before the first tensioning of reinforcements, one should wait until more than one sleeve has been positioned to provide sufficient height for filling the collar throughout. More often than not, a slight squeezing of the collar will be only necessary accurately to align successive sleeves. This method is also valuable in sparing successive tensioning manipulations.

The squeezing collar that has just been described may be used as a cap in driving either by ramming or by loading the pile with or without vibration, or by screwing with or without vibration. To this end (Figs. 12, 13 and 14), one will interpose between staves or like members 21 holding the reinforcements, further distance or spacing members 23 which are adapted to fill substantially the whole space available between the jacket and pile, and are squeezed on the pile without intervening reinforcements, either directly or with intervening materials having a high friction coefficient, for instance resins or hard rubber stuck to members 23. As shown on Fig. 14, the staves or like members 23 may be combined with U-shapes 23a and said staves 23 are made as rough as possible, e. g. by means of very hard materials such as chilled steel shot, carborundum and the like imbedded in the component material thereof. It is also possible to use entirely metallic elements adapted to contact the pile through very hard points or ridges, evenly distributed and penetrating superficially into the pile surface. Whatever the shape of said elements may be, one succeeds in making them altogether fast with the pile and in transmitting all driving forces through their agency irrespective of the manner of driving the pile. As an example, I have shown on Fig. 12 an annular ram or monkey 27 acting on the top of staves 23.

During this operation, the reinforcements may be held both by squeezing staves 21 and by leaving the tensioning members operative. They are thus secured against slippage. The driving forces exerted on the pile are perfectly distributed owing to the great length that members 23 may assume; it also enables to set a maximum for the driving forces to be applied to the pile and to adjust them by varying the pressure within the collar; hence any risk of crack of the pile under driving stress may be removed. Should the driving forces exceed a maximum compatible with the pile strength, the collar will slip and the pile will be protected. In this case, the reinforcements held both by friction on concrete and their end anchorage will not slip; only staves 21 will slide along still tensioned reinforcements. For staves 21 a coefficient of friction on reinforcements smaller than the coefficient of friction between reinforcements and concrete may be secured.

In order that the manner of carrying out this invention and its advantages may be grasped more easily, I shall set forth by way of example a process of constructing hollow circular piles having an outer diameter of 0.60 m. and an inner diameter of 0.40 m.

It will be assumed that the pile shall be provided with 12 permanent reinforcements made of drawn wire having a diameter of 5 mm., the ends of which are spirally wound and imbedded in concrete. They will be accommodated in suitably shaped grooves. The members 21 and 23 have a height of about 1.25 m. and the sleeve 0.80 m. Before shrinkage, the inner diameter of the collar is equal to 0.615 m. After tensioning the reinforcements, the grooves are filled with a cement mortar having very fine grains, which is smoothed with an iron to leave a hollow having a depth of 5 mm.; squeezing strips preferably made of moulded cement and shaped as shown on Fig. 14 will be used.

In this particular instance, there will be six members 21 having a breadth of 80 mm., each of which corresponds to two reinforcements, and 18 members 23.

The distribution of reinforcements on the periphery is immaterial and it may be uneven without any drawback. The device for tensioning reinforcements may comprise for instance three bars having V-shaped notches at their ends, wherein two reinforcements are jammed by means of a wedge; tension is produced for each group of four reinforcements by two screw jacks engaging the corresponding bar. Such an arrangement has the drawback of obstructing the pile centre. If it is desired to clear the centre, for instance with a view to accommodating a dredging device, it is only necessary to shape the member transmitting stresses from jaws to jacks, as a ring (similar to ring 25 on Fig. 12) which may be in two parts to make manoeuvres easier. In order to facilitate handling, the collar may be balanced by means of counterweights. The collar will be shifted to the proper position for the next sleeve, and will be shrunk again.

The pile will then be drawn:
1. Either by stressing the collar downwardly with jacks, as I did for consolidation of the harbour station at Le Havre; the method may be improved if need be by vertically vibrating the pile through the collar;
2. Or by ramming; for this purpose, a cap, for instance a mere steel member which may be hit upon by any known device, may be placed on the staves 21, 23. If the blows are imparted vertically by means of a ram or monkey which is symmetrical with respect to the axis of the pile and has an end face at right angles with said axis, the pile will be driven vertically and automatically set upright again should any deviation happen.

Instead of providing on the outer surface of the pile permanent reinforcements that it is necessary to protect, it is possible to use in driving the pile provisional reinforcements which will be allowed to decay through corrosion, then to let down through the pile inner recess one or more reinforcements that will be subsequently anchored in bottom part, for instance by pouring concrete; said reinforcements will then be tensioned after concrete has set, and fixed under tension. The inner reinforcements may be protected against oxidation by pouring concrete, preferably lime concrete, in the pile central recess. For positioning said reinforcements, passages having a small diameter may also be provided within the pile wall. Such an arrangement is particularly of interest in the case of piles having a large size or a polygonal cross-section. It will readily be understood that the apparatus described in connection with circular piles are likewise suitable with polygonal piles, provided staves 21, 23 in the collar are properly shaped. Such an arrangement is illustrated by Fig. 15 on which parts identical to those described in connection with circular piles bear the same reference characters.

The squeezing collar above described is but one of the means which may be devised to secure reinforcements to sleeves without obstructing the plane of joint. As shown on Figs. 16 and 17, it is also possible to provide in the pile wall, recesses 29 the lower face 30 of which, used as a bearing, may as far as required be strengthened by suitable reinforcements 21, e. g. flat irons. Pairs of brackets 32 contacting said lower face 30 and side wall of elements 1 provide bearings for jaws 33 e. g. with wedges 34 to hold reinforcements.

Whatever the case may be, previously built up tension may be kept and even any tension loss may be made up for, by fitting jaws 33 with screws 35, or jacks, abutting on brackets 32.

In the foregoing specification, I have assumed that all vertical reinforcements start from the base of the pile and run up to the top; however, it is also possible to lay at any time sleeves to which provisional or permanent reinforcements have been secured, thereby increasing the total number of reinforcements; conversely, permanent reinforcements the extension of which above a certain level would become useless may be cut away. Where compression of protective mortar is not sufficient to keep tension through adhesion when the collar has to be lifted (even if special cements have been used), it is possible as shown on Fig. 18, to provide anchorages in form of grooved metal members 36 set in the marginal portion of the sleeve when the latter is manufactured; the reinforcements 5 may be secured thereto by one or more keys such as 37.

The piles above described comprise integral sleeves but each sleeve may also be made of several component parts with vertical joints therebetween. In such a case, the component parts may be connected either with staggered vertical joints (the parts may have on their contacting faces reinforcements parallel with said faces) or by laying in horizontal joints reinforcements preferably made of flat iron bent as required, or spirals of round wire. Figs. 19, 20 and 21 are an example of such an arrangement. The members are united under tension e. g. by means of hoops such as 38; the hoops are closed by welding. They are heated, e. g. electrically by bringing current at both ends of a diameter so as to cause them to expand, thereby enabling of shifting them to position 38. When cooling, the hoops become tensioned.

In the case of piles or other constructions with superimposed recesses, reinforcements may be placed within said recesses. However, it will be understood that neither the manner of keeping tension by means of a collar nor by means of brackets hung from the wall are any longer applicable, the latter, particularly if the recesses are too small to enable convenient access to members 31, 32 shown on Figs. 16 and 17. Moreover, it is quite difficult to put the sleeve component parts in their places unless vertical joints are provided to divide into two parts the recesses for accommodation of reinforcements, and correspondingly widened.

In those various cases, the tensions may be kept in various ways while a new sleeve is being placed. Figs. 19, 20 and 21 illustrate one of the ways, taken as an example. Assuming a sleeve made up of $2n$ elements $b_1, a_2, b_3 \ldots a_{2n-2}, b_{2n-1}, a_{2n}$, a bearing will be taken on even elements $a$, first placed in position, for tensioning reinforcements assumed to be located in the vertical joints. The odd elements $b$ will then be placed and the tension keeping members will rest upon them. The tensioning members will be located high enough to enable of positioning the tension keeping members. A new tier of even elements $a$ is then placed and so on. It will be realized that the making of vertical joints, followed if it is so desired with positioning of hoops, under tension if need be, may take place at any time as soon as longitudinal reinforcements are tensioned. In such a case the use of a collar may be contemplated only for pile driving purpose.

Members A on the figures are tensioning devices comprising jaws with wedges and jacks or screws V resting on even sleeve component parts $a$.

Members B are tension keeping members that rest on odd component parts $b$ having the same height as component parts $a$ and placed in position after them. The tensioning members A may be bars provided at their ends with V-shaped notches forming wedge jaws. Traction is produced by jacks including four screws for each tensioning member. The screws are high enough to allow of placing members B which are identical to members A.

From Figs. 19, 20 and 21, it will be understood that when the tier of component parts $a$ is in its place and reinforcements have been tensioned by members A, the component parts $b$ may be placed in position. Tension keeping members B are then shifted (thus $B_{2n-1}$ is shifted to $B'_{2n-1}$ on Fig. 21); tension is kept by members B while the reinforcements are sealed in the vertical joint planes, then a further tier of component parts $a$ is placed and so on.

A particularly valuable application of a prestressed pile made up to jointed elements is the manufacture of piles adapted to be screwed, and this for various reasons. Examples are illustrated on Figs. 22, 23 and 24. In the first place, screws having a large extent, both in respect of diameter and height, are easily constructed from elements simple in shape, identical, united along helical joints, either parallel with or at right angles to the screw-thread; the elements may include (a) blocks such as 40, the combination of which forms a kind of coil spring limited by two concentrical cylinders and helical surfaces at right angles to said cylinders, (b) between the coils of said spring, further elements 41 having generally the same inner diameter but such an outer diameter that it forms, in the element combination the bottom surface of the screw-thread. As shown on Fig. 22, the elements of the screw-thread may be made of concretes having a high strength in tension, or as shown on Fig. 24 from concrete 43 with a sheet metal lining 42; reinforced or pre-stressed concrete, cast iron, sheet metal, cast steel and the like may also be used.

Solid piles may be constructed in this way but hollow piles are preferable because:

1. They may be made with simpler shapes corresponding to the section of a kind of coil spring by helical surfaces at right angles to those which limit said coil spring;

2. The tensions required to secure a predetermined strength, through compression, are less.

3. It is easy to arrange longitudinal inner reinforcements to produce compression.

4. Manipulations can be effected through the pile inner recess (dredging, drilling, water or air injection).

By reason of the small pitch of said helices, the various elements may be assembled together first by placing a reinforcement consisting of round wires or a metal sheet such as 44 in the helical joint along the screw, then squeezing the reinforced joint by a compression from tensioned reinforcements 100, parallel with the generatrices of the barrel or arranged according to helices preferably at right angles to the screws as illustrated in Figures 22 and 23. The screw which has a fairly small height will generally be constructed before driving; reinforcements will be placed very conveniently in the central tube or in recess provided in the cylindrical wall, or on the outer surface, in grooves if need be; it is also possible to use the joints, suitably widened, of the members constituting the screws, or passages in said members. The reinforcements may be anchored at both ends on cylindrical, reinforced or pre-stressed sleeves which may be integral or consist of several elements assembled together by hooping; each sleeve has on the helix side, an end surface consisting of one or more helical inclines having an overall extent of $2\pi$; the ends of the incline or each incline are connected together by a surface at right angles to said end surface.

In the case of steel screws, or steel lined screws, the elements may be welded together after mounting; in the case of screws or piles having a large diameter, it is possible to use helical reinforcements tensioned as set forth in my French patent application Ser. No. 480,861, filed June 29, 1943.

Any and all reinforcements may be accommodated in grooves and protected by anti-rust layers or coatings, zincing, parkerising, varnishes of various kinds and the like.

A screw thus completed may be considered as the first sleeve of the pile above described. The screw reinforcements may also be extended into the pile.

Piles adapted to be screwed should further have very high capacity to withstand twisting. This is easily obtained in the case of piles in accordance with this invention, owing to general properties of pre-stressed structures; the object aimed at may be secured, for instance, by developing strong longitudinal compressions by means of mighty tensioned reinforcements, which may be arranged to be recovered; as a matter of fact, this is the main application of recoverable tensioned reinforcement system above described. It is thus possible to obtain very strong compressions in an economical way. The reinforcements may also be laid in the form of helices with a large pitch; the slant of said helices is then a favourable factor which may allow of reducing or even doing away with any tension stress in concrete, without resorting to hoops. One will use e. g. reinforcement at right angles to the screws, which will therefore be in line with the screw reinforcements proper. Screwing may be effected for instance by acting on the squeezing collar above described; it is only necessary to arrange it so as efficiently to drive members 21, 23 round; the reels supporting the reinforcements shall also move round so that it is advantageous to secure them on the collar. The screwing action on the pile collar may be exerted as is known, through jacks suitably located by taking rest on a further collar secured on the ground, for instance to piles or any standing structures or parts. It is thus possible to develop huge screwing stresses, amounting to several ten thousand kilos, by reason of the huge strength in shearing which can be imparted to pre-stressed concrete. Screwing will considerably be facilitated by vibrating the pile through powerful vibrators secured on the driving collar.

In all these embodiments relating to assembling elements of various shapes by tensioning reinforcements, said elements may of course be made of a material other than concrete; for instance column or post component parts made of hard stones interconnected by a good grade mortar, with a concrete point for anchoring reinforcements therein, can afford excellent piles which are particularly strong, in the respect of the loads per unit they are capable of withstanding as well as in the respect of fastness to chemical attacks. The methods above described allow of constructing piles from bricks of conventional type or of a specially studied design; piles may be made from suitably shaped molded bricks, by using a squeezing and driving collar as described with reference to Figs. 12 and 13; likewise, piles may be produced from cast iron, cast steel, glass and like elements, intervening between or combined with concrete or brick elements. One may notably construct hollow towers of any shapes and sections from pre-stressed hard stone. The manufacture of piles adapted to be screwed, from plain bricks built up into an helix, provided with sheet metal screws, or screws made of another material, even special bricks, offers much interest in countries where stones are lacking and cement is not readily available.

It will be understood that the manners of construction above described in connection with circular piles may be extended to piles of any shape, particularly square, octagonal and like piles, and of any size such as caissons driven by undercutting or by means of compressed air.

In the latter case, it is possible to build according to the above methods, combined or not with general methods relating to pre-stressed or reinforced concrete, the vertical walls of the working chambers, their ceilings, the cofferdams and, below the ceilings, the lock-chamber shafts and in many cases the shafts themselves. As to ceilings, it will be only necessary, after making the working chamber walls as above described, to place a layer of elements assembled together according to the methods in use with pre-stressed concrete, and to connect said layer with the bevel edge of the side walls by tensioning vertical reinforcements, then to place above said layer upper members which will likewise be connected with said bevel edge. As to shafts, they will be constructed as hollow piles, care being exercised in hooping, which may be made as described in my aforesaid French patent application Ser. No. 480,861. They may also be produced from pipe elements which are hooped beforehand under tension.

The method according to this invention also allows of constructing coffer-dam elements playing a part analogous to that of metal pile-planks but without any limit as to dimensions and strength, which elements may be driven by ramming, vibrating, undercutting or even by means of compressed air. The elements may be connected together like metal pile-planks through suitable members. It is also possible to build elements 45 which are not hooked to one another but are shaped at their sides as shown on Figs. 25 and 26, and may be united through concrete 46 poured under water.

The elements 45 may be driven by ramming through suitable caps made fast with the last element placed in position through the very tensioned reinforcements. An example of such an embodiment is illustrated by Fig. 27.

A rubber mass 47 accommodated in a groove provided in steel cap 48 covers the concrete element 45. The tension of reinforcement 5 held by wedges 50 in a jaw 51 compresses the rubber mass and secures the cap, preventing any rebound thereof. The element 45 may also be driven by under-cutting, i. e. dredging in vertical wells 52 (Fig. 26) or injection. It is of advantage to impart vertical vibrations with large accelerations, for pre-stressed materials ensure an excellent transfer of vibration, as good as obtained with integral steel pile-planks; this is not the case with constructions built up with conventional reinforced concrete.

The means above described may be extended without any difficulties to caissons of any dimensions, which may even have different cross sections at various levels, or may comprise intermediate floors and so on. All elements constituting a horizontal section of the construction may obviously be made from separately built up parts, interconnected by tensioned reinforcements, in accordance with the various methods employed in pre-stressed concrete technics.

In particular, in carrying out this invention, one may use the methods described in my aforesaid French patent application Ser. No. 480,861, filed June 29, 1943, which enable of making cylindrical barrels of any shape, from successive elements with permanently compressed joints therebetween. The manners of tensioning set forth in said patent application are obviously applicable for tensioning helical reinforcements having any pitch. It is clear that this invention is applicable to the manufacture of caissons adapted to be driven by means of compressed air, particularly where working chambers, shafts and lock-chambers of large size are required.

Again, it will be pointed out that the driving method according to this invention, by reason of the very small space it requires, enables of driving piles of considerable height and cross-section on a very restricted working-yard; it is thus quite suitable for driving piles or the like within a working chamber confined in an atmosphere of compressed air.

As the driving direction is immaterial, this invention may be applied when making slanting or horizontal tubes, particularly under-river tunnels, from working chambers built up on river sides, according to any method (compressed air, exhausting, freezing or drying up ground).

While I have described what I deem to be efficient and reliable embodiments of my invention, I do not wish to be limited thereto, as many alterations may be brought about without departing from the spirit of the appended claims.

What I claim is:

1. The process of gradually rigidifying an elongated structure driven into ground and built up from successive pre-built sections, which comprises driving along with the structure a reinforcement attached to the lastly added section, adding a further section, tensioning said reinforcement, and attaching it in still tensioned condition to said further section.

2. The process of simultaneously constructing and driving a pile into ground, which comprises sinking a first pile section together with at least one reinforcement which has an end fast with said first pile section and has a length that substantially averages at least the depth to which said pile is to be buried; adding to the first section successive pre-built pile sections each in line with the preceding section, while driving the sectional pile into ground as section addition proceeds; tensioning a length of said reinforcement corresponding to that of each newly added section, whenever a further section is added; and fastening said reinforcement in still tensioned condition to said newly added section.

3. The process of simultaneously constructing and driving a pile into ground, which comprises sinking a first pile section together with a plurality of reinforcements, each of which is fast with said first pile section through an end thereof and has a length substantially averaging at least the depth to which said pile is to be buried, the reinforcements being so arranged as to emerge from said first section substantially flush with its peripheral surface, thus forming a cage in line with said first section; adding to the first section, within said cage, successive pre-built pile sections, each one in line with the preceding section, while driving the sectional pile into ground as section addition proceeds; tensioning a length of said reinforcements corresponding to that of each newly added section, whenever a further section is added; and fastening said cage with its component reinforcements still in tensioned condition to said newly added section.

4. The process of claim 3, the last named step comprising jamming the cage between the periphery of said newly added section, and an inwardly expansible, peripherally confining member; and causing said member to expand.

5. The process of claim 3, the tensioning step comprising backing a reinforcement tensioning means on said newly added section, so as to transfer thereto a compression stress directed towards said first section.

6. A pile nose or first section, which comprises a mass of molded material having a recess in its top portion and at least one passage running from said recess to the outer surface of said mass; a reinforcement laid in said passage from said recess and emerging through the outer surface of the mass; and means in said recess, accessible from the top portion of the mass, to provide provisional anchorage of said reinforcement in said mass.

7. A pile nose or first section, which comprises a mass of molded material having a recess in its top portion and at least one passage running from said recess to the outer surface of said mass; a reinforcement having its inner end in said recess, accommodated in said passage and emerging from the outer surface of the mass; and means adapted to be released through said recess and located therein, providing a jaw to hold said reinforcement end in said recess.

8. The process of simultaneously constructing and driving a pile into ground, which comprises sinking a first pile section together with a plurality of reinforcements, each of which is fast with said first pile section through an end thereof and has a length substantially averaging at least the depth to which said pile is to be buried, the reinforcements being so arranged as to emerge from said first section substantially flush with its peripheral surface, thus forming a cage in line with said first section; adding to the first section, within said cage, successive pre-built pile sections, each one in line with the preceding section, while driving the sectional pile into ground as section addition proceeds; tensioning a length of said reinforcements corresponding to that of each newly added section, whenever a further section is added; placing along each reinforcement a strip of a binding material adapted to set under pressure, said strip being of a length equal to that of said newly added section; jamming the cage with said strips along the component reinforcements of said cage, between the periphery of said newly added section and an inwardly expansible, peripherally confining member; and causing said member to expand so as to bind the tensioned reinforcement with said newly added section.

9. In the process method of constructing a pile from successive pre-built sections with tensioned peripheral reinforcements running along the pile and anchored to one of the first pile sections, the steps of adding a new section to and in line with a preceding section having the reinforcements provisionally fastened thereon in tensioned condition, applying said reinforcements on the periphery of said new section, tensioning that part of said reinforcements which extends along said new section, provisionally fastening said part of the reinforcements in tensioned condition to the new section, and unfastening said reinforcements from said preceding section.

10. A pile which comprises an end portion including a screw-thread, and tensioned reinforcements positioned along helices substantially at right angles to the screw-thread.

11. A pile nose or first section, which comprises an elongated mass of molded material, and at least one steel reinforcement emerging from said mass, the inner end of which is scrolled in spiral form in a longitudinal plane, is embedded in said mass of molded material and is tempered.

12. A pile which comprises a pile of separate sections in abutting relationship, having registering grooves to provide sunken passageways in the pile periphery; a plurality of tensioned reinforcements anchored in the end or tip section thereof positioned in said passageways; and binding material in each section of the grooves thereof, adapted to embed the corresponding reinforcement and bind it integrally with said section.

EUGÈNE FREYSSINET.

REFERENCES CITED

The following references are of record in the file of this patent:

UNITED STATES PATENTS

| Number | Name | Date |
|---|---|---|
| 827,535 | Kahn | July 31, 1906 |
| 1,070,862 | Vernon | Aug. 19, 1913 |

FOREIGN PATENTS

| Number | Country | Date |
|---|---|---|
| 430,378 | Great Britain | 1935 |